(12) United States Patent
Kent

(10) Patent No.: US 7,150,591 B1
(45) Date of Patent: Dec. 19, 2006

(54) TRUCK ORGANIZER

(76) Inventor: James A. Kent, RR 1, Box 286, Glenwood, WV (US) 25520

( * ) Notice: Subject to any disclaimer, the term of this patent is extended or adjusted under 35 U.S.C. 154(b) by 0 days.

(21) Appl. No.: 11/044,398

(22) Filed: Jan. 26, 2005

Related U.S. Application Data

(60) Provisional application No. 60/573,238, filed on May 20, 2004.

(51) Int. Cl.
*B60P 3/073* (2006.01)

(52) U.S. Cl. .......................................................... 410/7

(58) Field of Classification Search .................... 410/3, 410/4, 7, 13, 17, 24, 24.1, 26, 77; 296/3; 211/13.1; 224/400, 402, 403, 404, 405
See application file for complete search history.

(56) References Cited

U.S. PATENT DOCUMENTS

| | | | |
|---|---|---|---|
| 3,704,794 A | 12/1972 | Flamm | 214/85 |
| 3,972,433 A * | 8/1976 | Reed | 414/462 |
| 3,989,148 A * | 11/1976 | Donohue | 414/537 |
| 4,824,157 A * | 4/1989 | Nielsen et al. | 296/100.01 |
| 5,393,191 A * | 2/1995 | Alexander | 414/537 |
| 5,553,762 A * | 9/1996 | Brown | 224/403 |
| 5,622,299 A | 4/1997 | Berard | 224/403 |
| 6,077,007 A | 6/2000 | Porter et al. | 410/140 |
| 6,705,820 B1 * | 3/2004 | Schilling | 414/462 |
| 2004/0195857 A1 | 10/2004 | Chverchko et al. | 296/100.07 |

* cited by examiner

*Primary Examiner*—H. Gutman
(74) *Attorney, Agent, or Firm*—Steptoe & Johnson PLLC

(57) ABSTRACT

A truck bed organizer comprising two base sides, a rear base end, and a front cab base end. Each base side has a base side rod and two base side legs ending in base side feet. The rear base end has a rear base end rod and two rear base end legs ending in rear base end feet. The front cab base end has a front cab base end rod and two front cab base end legs ending in front cab base end feet. The base side rods, rear base end rod, and front cab base end rod form a substantially rectangular shape upon which an elevated flat platform is optionally attached. A base brace optionally provides structural support as desired. An alternative embodiment of the truck bed organizer comprises an elevated flat platform, a means for positioning the platform, and a substantially empty storage cavity below the platform.

20 Claims, 6 Drawing Sheets

TRUCK ORGANIZER

CROSS-REFERENCES TO RELATED APPLICATIONS

This application claims the benefit of U.S. Provisional Application No. 60/573,238 filed May 20, 2004.

BACKGROUND OF THE INVENTION

1. Field of the Invention

This invention relates generally to devices for organizing truck beds, and in particular, to a device that provides an elevated storage surface above the floor of a truck bed.

2. Description of the Related Art

Conventional pickup truck beds or boxes provide a spacious storage area for transporting a wide variety of items such as power tools, rakes, shovels, saw horses, fishing equipment, coolers, and other gear and equipment. Pickup truck beds are especially convenient for use by campers, lawn mowing crews, craft dealers, bikers, farmers, ranchers and hunters. Many of these outdoor activities are growing in popularity, whereas those activities more associated with work-use of pickup truck beds are remaining stable. These outdoor activities often require bicycles, motorcycles, all-terrain vehicles, and related equipment and gear for making trips more comfortable. However, attempting to pack all of these necessities in the bed of a pickup truck quickly becomes a challenge. In particular, large bulky items such as all-terrain vehicles and lawnmowers tend to consume most or all of the available space in a truck bed, if they even fit at all between the wheel well covers, leaving little or no additional storage space for other objects. Often, items are left behind due to lack of available storage space, and while on the trip, these items are invariably missed at some point in time when needed.

Some previous attempts have been made to organize truck beds and thereby increase the number of items that can be stored therein. For example, U.S. Pat. No. 3,704,794 issued Dec. 5, 1972 to Flamm, U.S. Pat. No. 5,622,299 issued Apr. 22, 1997 to Berard, and U.S. Pat. No. 6,077,007 issued to Porter et al each disclose means for providing a storage space located above the wheel well covers of a truck, thereby increasing the effective width of the storage space. However, none of these previous attempts preserve the bulk of the storage space available underneath the elevated storage area. Furthermore, using other existing devices for hauling bicycles and the like on the rear of vehicles or alternatively hauling a utility trailer behind a vehicle both preclude the possibility of simultaneously pulling a camper behind the vehicle as well.

For the foregoing reasons, there is a need for a product to organize a truck bed that helps maximize the available storage space. Specifically, there is a need for a product that not only provides an elevated storage area above the wheel well covers of a truck bed, but also helps maximize the available storage space underneath the elevated storage area.

SUMMARY OF THE INVENTION

The present invention is directed to an apparatus that satisfies the need for a truck bed organizer that helps maximize the storage space available in a truck bed both within the truck box between the wheel well covers and above the truck box itself. One embodiment of the apparatus comprises an elevated storage area and a substantially empty storage cavity underneath the elevated storage area. Another embodiment of the apparatus comprises two base sides, a rear base end, a front cab base end, and base braces as needed. Each base side has a base side rod and two base side legs ending in base side feet. The rear base end has a rear base end rod and two rear base end legs ending in rear base end feet. The front cab base end has a front cab base end rod and two front cab base end legs ending in front cab base end feet. The front cab base legs are preferably longer than the rear base end legs and the base side legs to provide a positive front stop for all-terrain vehicle tires, lawnmower tires, and other hauled items. The base side rods, rear base end rod, and front cab base end rod form a substantially rectangular shape. The base brace spans from one base side rod to the other base side rod. The base side feet, rear base end feet, and front cab base end feet lie substantially in a floor plane. A deck providing an elevated platform is attached to the base rods. A loading ramp may also be attached to the rear base end to facilitate loading and to provide a positive back stop for all-terrain vehicle tires, lawnmower tires, and other hauled items.

In use, the truck bed organizer of the present invention is simply placed in the truck bed or box of a pickup truck or similar vehicle. The base side feet, rear base end feet, and front cab base end feet are placed directly on the floor of the truck bed, with the front cab base end closer to the truck cab and the rear base end closer to the rear of the truck. An all-terrain vehicle, bicycles, or other similar large items may be placed on the base side rods, deck, and/or bicycle holder assembly. Other items may be placed in the storage cavity underneath the elevated storage area.

The truck organizer serves outdoor recreating families, farmers, ranchers, hunters, bikers, campers, and other individuals by providing a means to easily organize gear and equipment in the back of a pickup truck. With the truck organizer of the present invention, large, bulky items can be placed in the elevated storage area and smaller items can still fit thereunder. The utility of the truck box is thereby maximized as a means for transporting gear and equipment without sacrificing the ability to pull or tow a camper or trailer as well.

BRIEF DESCRIPTION OF THE FIGURES

The present invention is described with reference to the accompanying drawings. In the drawings, like reference numbers indicate identical or functionally similar elements.

DETAILED DESCRIPTION OF THE PREFERRED EMBODIMENTS

Figure 1:
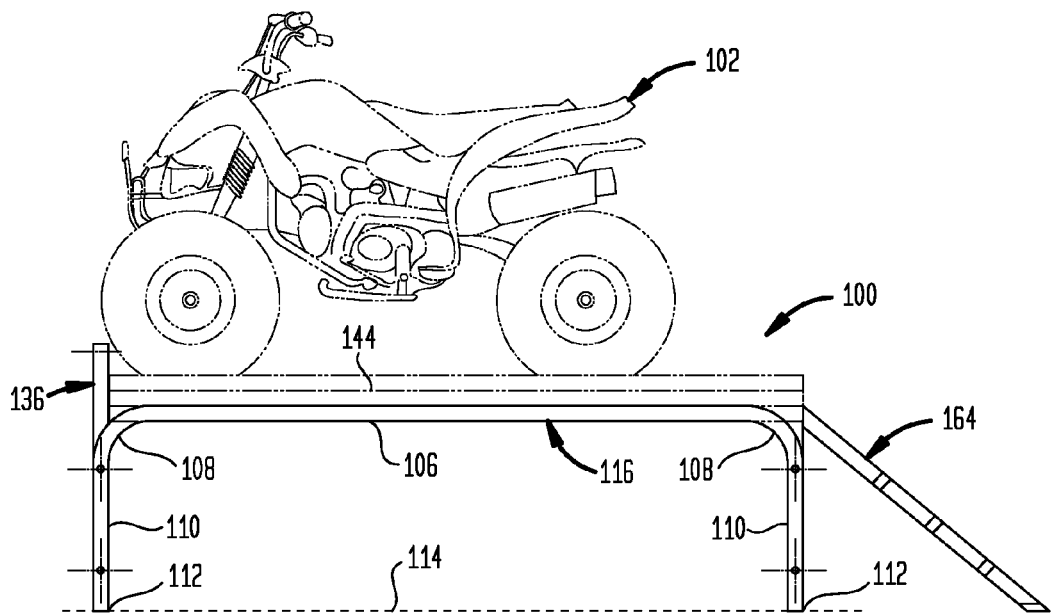
FIG. 1 is a side elevation view of an embodiment of a truck bed organizer of the present invention carrying an all-terrain vehicle.
Figure 2:
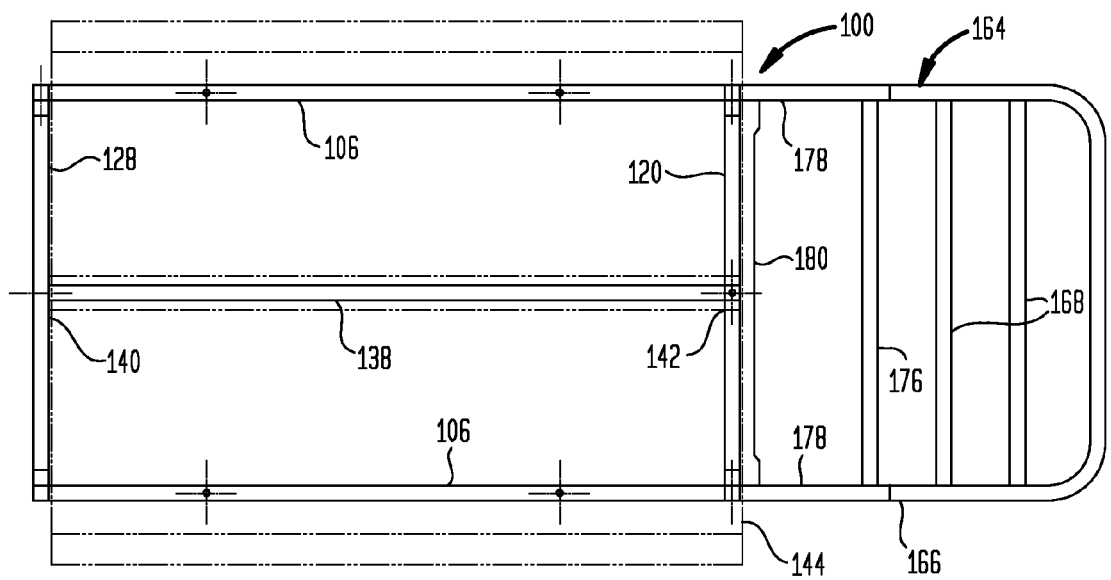
FIG. 2 is a plan view of the truck bed organizer of FIG. 1.
Figure 12:
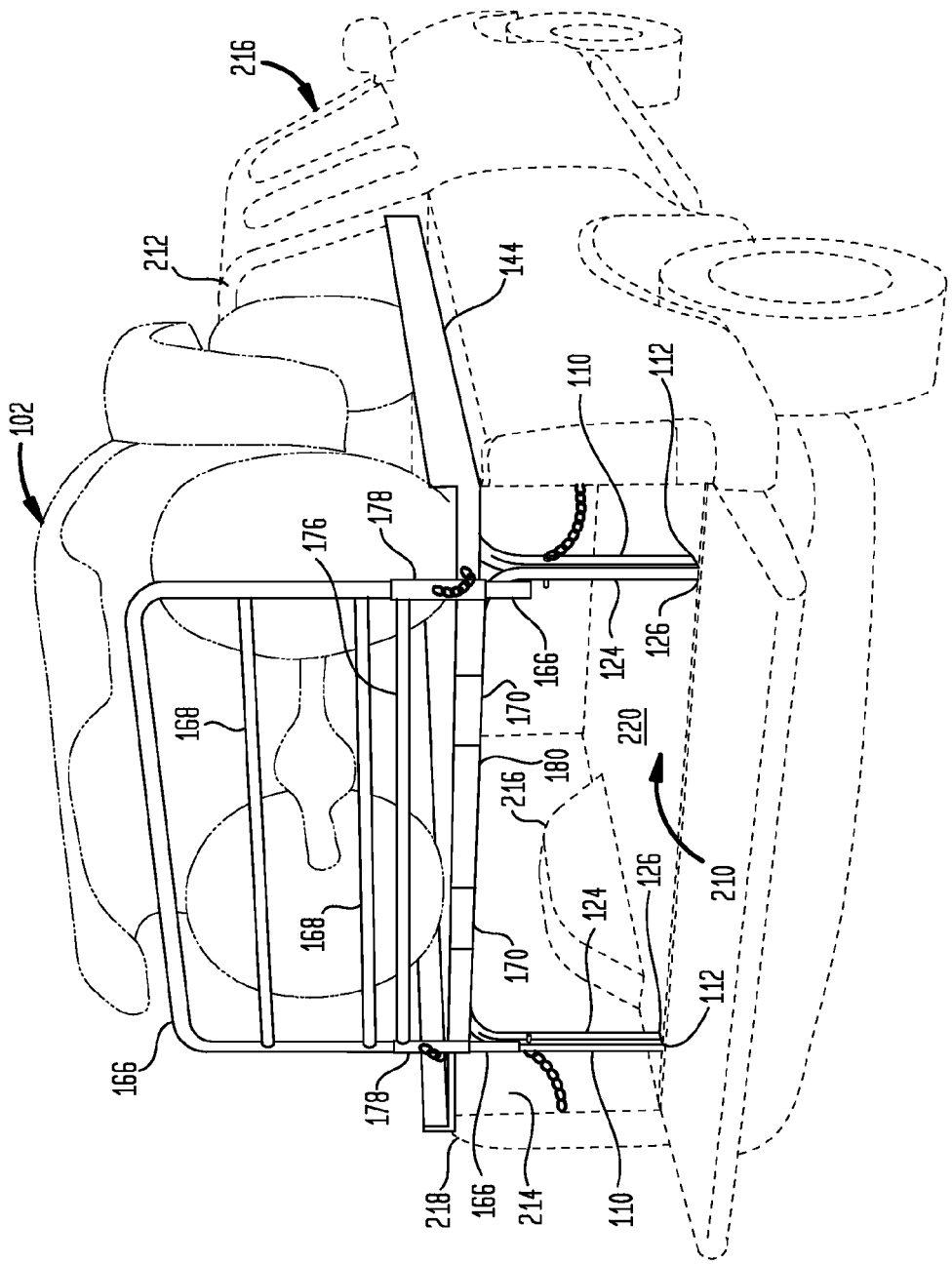
FIG. 12 is a perspective view of the truck bed organizer of FIG. 1 placed in a truck bed and carrying an all-terrain vehicle.

The present invention is directed to a truck bed organizer having an elevated storage area that permits relatively unobstructed access to a lower storage area underneath the elevated storage area. When placed in a truck bed, the truck bed organizer allows relatively unobstructed storage of items along the full length of the truck bed floor as well as in or on the elevated storage area. With reference to the drawings, and particularly to FIGS. 1, 2, and 12, an embodiment of a truck bed organizer 100 has two base sides 116, a rear base end 118, a front cab base end 136, and an optional base brace 138.

Each base side 116 preferably has a substantially straight elongated base side rod 106 that smoothly arcs at each of two base side rod ends 108 into two base side legs 110. The base side rods 106 are preferably positioned substantially parallel to one another. The base side legs 110 are also preferably positioned substantially parallel to one another, and are furthermore preferably positioned substantially perpendicular to the base side rods 106. Each base side leg 110 ends in a base side foot 112, and each base side foot 112 preferably lies substantially in a floor plane 114. Each base side foot 112 may optionally be fitted with a rubber foot insert or boot.

Figure 3:
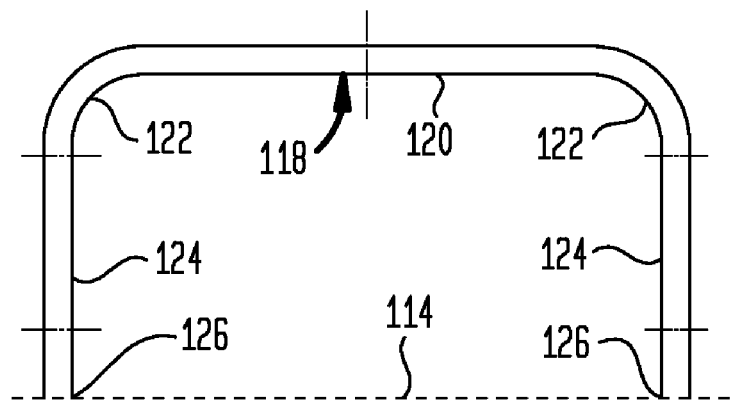
FIG. 3 is an elevation view of a rear base end of the truck bed organizer of FIG. 1.

As shown in FIG. 3, the rear base end 118 preferably has a substantially straight elongated rear base end rod 120 that smoothly arcs at each of two rear base end rod ends 122 into two rear base end legs 124. The rear base end rod 120 is preferably positioned substantially perpendicular to the base side rods 106. The rear base end legs 124 are preferably positioned substantially parallel to one another and to the base side legs 110. The rear base end legs 124 are preferably positioned substantially perpendicular to the rear base end rod 120. Each rear base end leg 124 is preferably attached to one of the base side legs 110. Each rear base end leg 124 ends in a rear base end foot 126, and each rear base end foot 126 preferably lies substantially in the floor plane 114. Each rear base end foot 126 may optionally be fitted with a rubber foot insert or boot.

Figure 4:
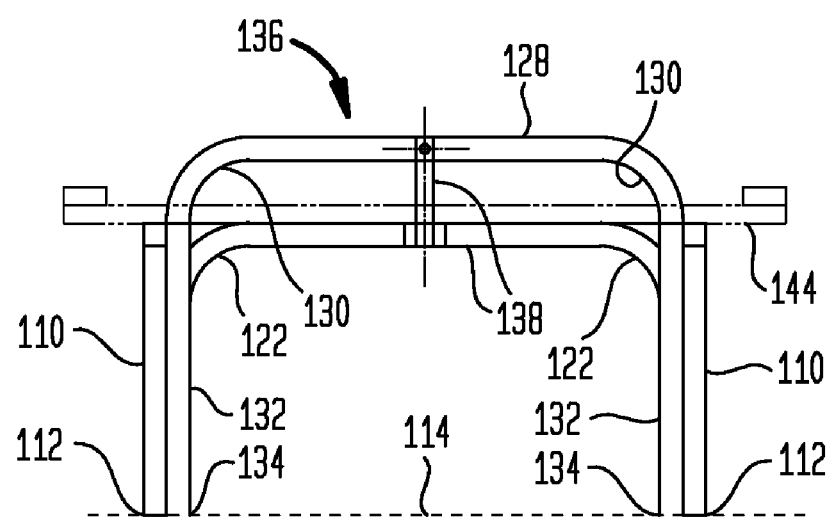
FIG. 4 is an elevation view of the truck bed organizer of FIG. 1 as seen from a front cab base end.

As shown in FIG. 4, the front cab base end 136 preferably has a substantially straight elongated front cab base end rod 128 that smoothly arcs at each of two front cab base end rod ends 130 into two front cab base end legs 132. The front cab base end rod 128 is preferably positioned substantially perpendicular to the base side rods 106. The front cab base end legs 132 are preferably positioned substantially parallel to one another and to the base side legs 110. The front cab base end legs 132 are preferably substantially perpendicular to the front cab base end rod 128. Each front cab base end leg 132 is preferably attached to one of the base side legs 110. Thus, the two base sides 116, the rear base end 118, and the front cab base end form a substantially rectangular shape. The front cab base end legs 132 are preferably longer than the rear base end legs 124 such that the front cab base end legs 132 can function as a positive stop for all-terrain vehicle tires, lawnmower tires, and other hauled items. Each front cab base end leg 132 ends in a front cab base end foot 134, and each front cab base end foot 134 preferably lies substantially in the floor plane 114. Each front cab base end foot may optionally be fitted with a rubber foot insert or boot.

The base brace 138 optionally extends from about a midpoint 140 of the front cab base end rod 128 to about a midpoint 142 of the rear base end rod 120. The base brace 138 preferably lies parallel to the base side rods 106, with a short extension on one ends that runs perpendicular to the base side rods 106 for attachment to the front cab base end rod 128. Additional base braces may also optionally extend from the front cab base end rod 128 to the rear base end rod 120 and/or from one base side rod 106 to the other base side rod 106.

Moreover, short chains with snaps are preferably attached to the truck bed organizer 100 for use in immobilizing the truck bed organizer 100. Other securing means may alternatively be used for such purpose including clamps, fasteners, clips, hooks, clasps, ropes, cords, and other similar means.

In use, the truck bed organizer 100 is placed on the floor 210 of a truck bed such that the front cab base end 136 is in proximity to the cab wall 212 of the truck 216, the rear base end 118 is in proximity to the rear of the truck, the base side rods 106 extend along the length of the truck bed above the tops of the truck wheel well covers 216 and adjacent to the side walls 214 of the truck bed, and the floor 210 of the truck bed is substantially within or parallel to the floor plane 114. Short chains and snaps or other securing means attached to the truck bed organizer 100 are then optionally hooked to tie down hooks located in the truck bed or to holes in the side wall upper rim 218 at the top of the truck box sides or edges to keep the truck bed organizer 100 securely in position within the truck box. For example, an eye bolt is preferably attached to each base side leg 110, for a total of four eye bolts. A twelve inch length of chain is then attached to each eye bolt, for a total of four chains. The chains are attached to truck bed internal tie-down hooks or to holes in the side wall upper rim 218. Items can thereafter be stored on top of the truck bed organizer 100 as well as between the base sides 116. The storage space above the truck bed organizer 100 is substantially free of obstructions such as wheel well covers. A substantially empty storage cavity 220 is also located between the base sides 116, and is likewise substantially free of obstructions such as diagonal cross-support members or support members traversing between the rear base end feet 126 or the front cab base end feet 134. The truck bed organizer 100 therefore helps to maximize the amount of storage space available in the truck bed by minimizing obstructions. The smoothly arcing nature of many of the components of the truck bed organizer 100 helps to minimize potential damage to stored items posed by sharp corners and helps to maximize the structural strength, integrity, and durability of the truck bed organizer 100.

The truck bed organizer 100 may be equipped with means for securing one or more vehicles. As shown in FIG. 1, an all-terrain vehicle 102 may be placed on the truck bed organizer 100 using a deck 144 comprising a single plate 146 spanning at least the base side rods 108 or two plates 146 positioned parallel to one another. The deck 144 is preferably substantially flat, extending from about the rear base end rod 120 to about the front cab base end 136, and is preferably rigidly attached to the truck bed organizer 100.

Figure 5:
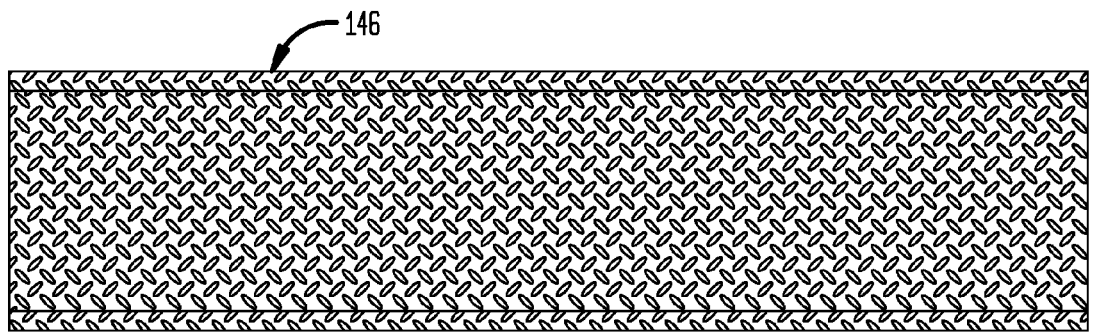
FIG. 5 is a plan view of a plate of the truck bed organizer of FIG. 1 wherein the deck is made of aluminum diamond tread plate or expanded metal.
Figure 6:
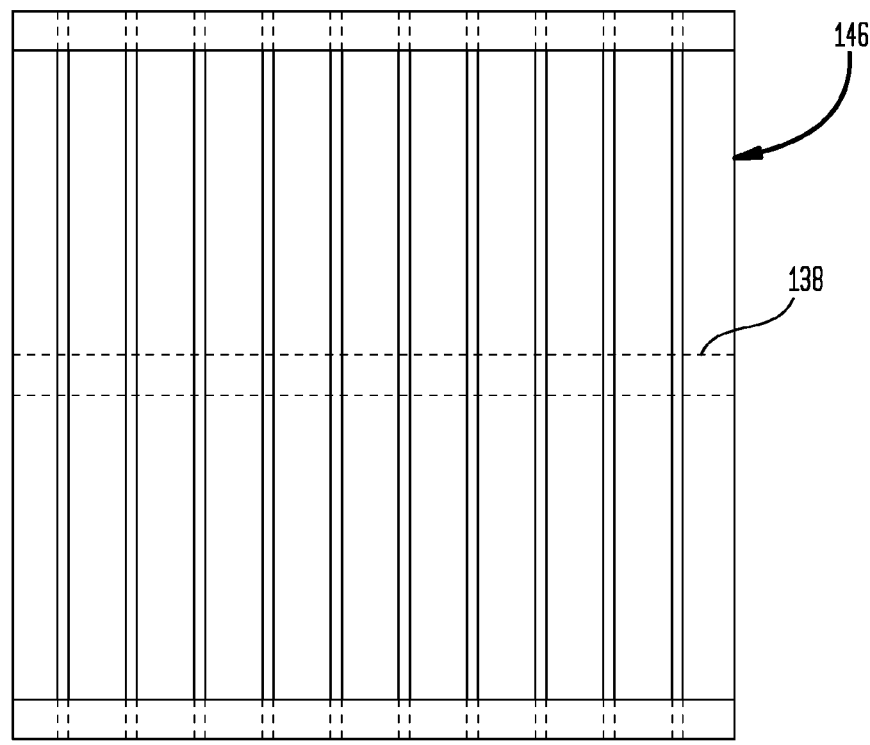
FIG. 6 is a plan view of a plate of the truck bed organizer of FIG. 1 wherein the deck is made of treated decking lumber.

When placed in a truck box, the deck 144 preferably spans across the entire truck box from one top rim of the truck box to the opposite rim, thereby "sealing" along the top of the truck box. An all-terrain vehicle 102 is simply placed on the deck 144, and may additionally be secured using tie-downs. For example, ratchet straps are preferably used to lock down the vehicle 102 on the deck 144. The plate 146 or plates 146 are preferably formed on a metal brake to the desired dimensions and geometry using aluminum diamond tread plate with slightly raised side edges as shown in FIG. 5, or alternatively may be made from decking treated lumber as shown in FIG. 6, or outdoor plywood, steel tread plate, or expanded metal. A single plate 146 preferably measures about fifty-four and one-half inches wide by about seventy-two inches long, whereas double plates 146 preferably each measure about eighteen inches wide by about seventy-two inches long. Alternative dimensions may also be used as dimensions vary for different vehicle models/makes and as various materials may be used for the plate(s) 146 as described above and for other components of the truck bed organizer 100.

Figure 7:
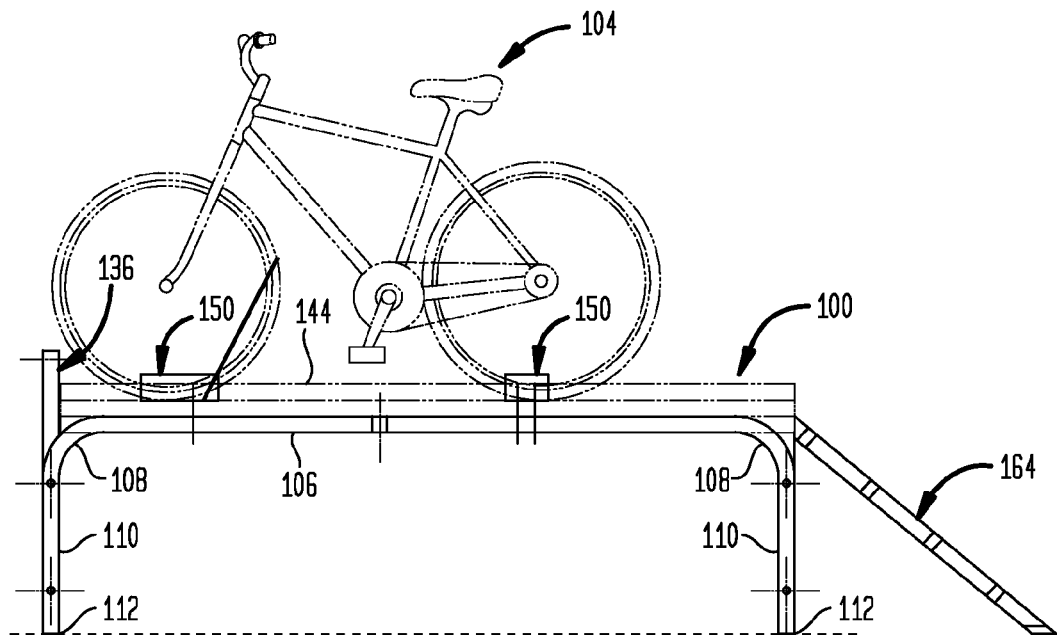
FIG. 7 is a side elevation view of an embodiment of a truck bed organizer of the present invention carrying a bicycle.
Figure 8:
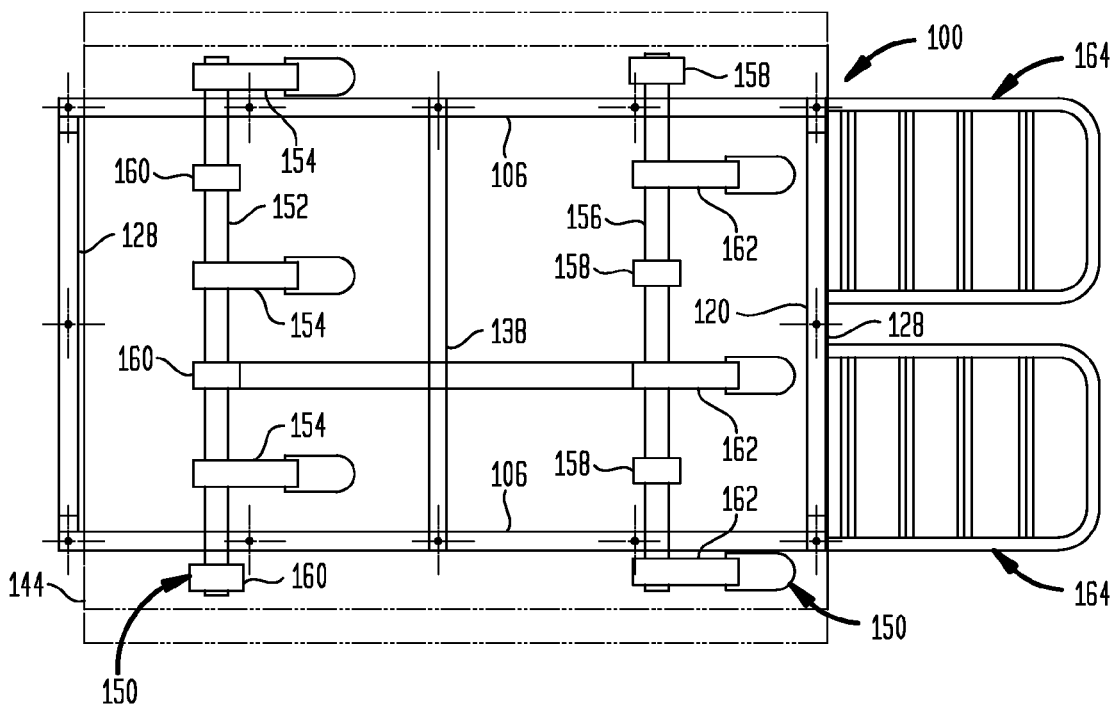
FIG. 8 is a plan view of the truck bed organizer of FIG. 7.
Figure 9:
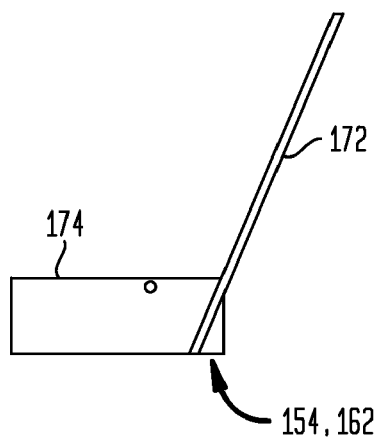
FIG. 9 is a side elevation view of a bicycle front wheel support of the truck bed organizer of FIG. 7.

As shown in FIGS. 7 and 8, the truck bed organizer 100 may be outfitted with a bicycle holder assembly 150 rigidly attached to the truck bed organizer 100. The bicycle holder assembly preferably has one or two support members 152, 156 that span the base sides 116. The bicycle holder assembly 150 is preferably mounted to the deck 144 and may additionally or alternatively be secured to the underlying framework of the truck bed organizer 100. The front support member 152 preferably has a plurality of front wheel supports or slots 154 spaced relatively evenly along its length. If used in conjunction with the rear support member 156, the rear support member 156 preferably has a plurality of rear wheel chocks 158 attached along its length such that the front wheel slots 154 and the rear wheel chocks 158 are aligned. A bicycle 104 may then be secured in place using each pair of aligned front wheel slots 154 and rear wheel chocks 158. The bicycle holder assembly 150 may further have a plurality of front wheel chocks 160 attached along the front support member 152 alternating with the front wheel slots 154, and a plurality of rear wheel slots 162 attached along the rear support member 156 such that the rear wheel slots 162 are aligned with the front wheel chocks 160. Multiple bicycles 104 may then be secured by the bicycle holder assembly 150, alternating frontward and rearward facing positioning of the bicycles 104. FIG. 9 shows the wheel slots 154, 162 in greater detail. Each wheel slot 154, 162 preferably has a loop 172 made of three-eighths inch steel rod or tube bent in half into a "U" shape with about a one inch radius and having a length of about seventeen inches and a width of about two and one-quarter inches. Each wheel slot 154, 162 also preferably has a wheel slot base 174 formed of a U-channel section of about one-eighth inch thick steel with a small hole, a length of about five or ten inches, a height of about three and one-half inches, and a width of about two and one-fourth inches. Alternate designs for the bicycle holder assembly 150 that function similarly to hold one or more bicycles may also be used. In particular, designs that maximize the number of bicycles held by the bicycle holder assembly 150 are preferred.

Figure 10:
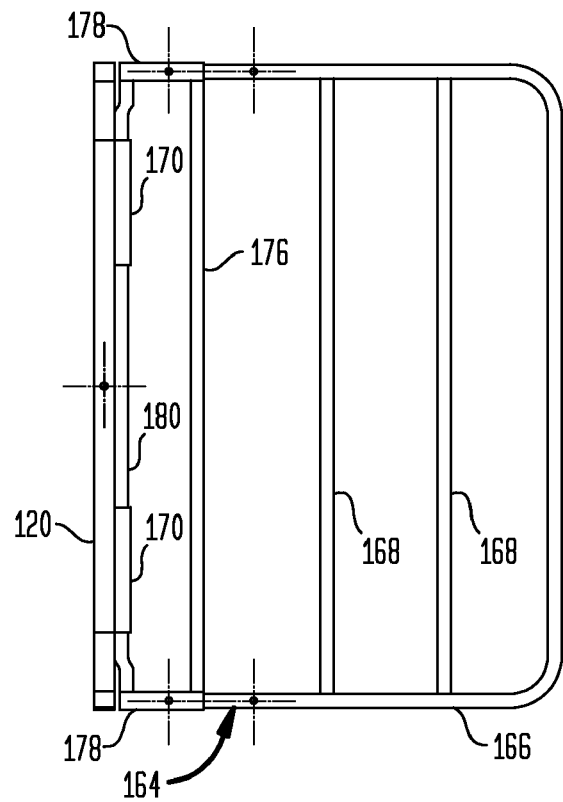
FIG. 10 is a plan view of a loading ramp of the truck bed organizer of FIG. 1.
Figure 11A:
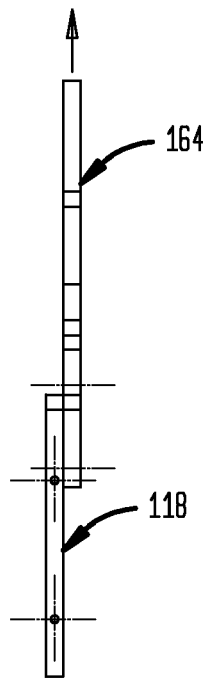
FIG. 11A is a side elevation view of the loading ramp of FIG. 10 in an upright position.
Figure 11B:
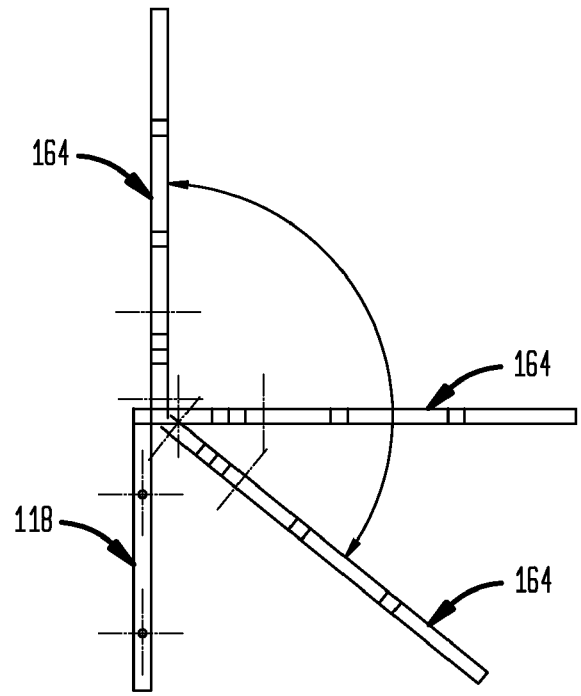
FIG. 11B is a side elevation view of the loading ramp of FIG. 10 rotating into a lowered position.

As shown in FIGS. 1, 2, 7, 8, and 12, the truck bed organizer 100 may be outfitted with one or more loading ramps 164 attached to the rear base end 118. The structure of the loading ramp 164 is shown in greater detail in FIG. 10, and the operation of the loading ramp 164 is shown in greater detail in FIGS. 11A and 11B. Specifically, the loading ramp 164 is preferably comprised of a generally rectangular frame 166 and a plurality of loading ramp cross bars 168 spanning the generally rectangular frame 166. The loading ramp 164 is preferably rotatably attached to the rear base end rod 120 of the rear base end 118. In particular, two support tubes 170 preferably constructed of nine inch sections of square tubing are preferably clamped and welded to the rear base end rod 120. A first loading ramp cross member 180 is positioned through the two support tubes 170 such that the first loading ramp cross member 180 freely rotates within the two support tubes 170. Two hinge end support tubes 178 are rigidly attached to the first loading ramp cross member 180, and a second loading ramp cross member 176 is rigidly attached to the two hinge end support tubes 178. The first loading ramp cross member 180 is preferably substantially parallel to the second loading ramp cross member 176, the two hinge end support tubes 178 are substantially parallel to one another, and the first loading ramp cross member 180 is substantially perpendicular to the hinge end support tubes. Thus, the first loading ramp cross member 180, the second loading ramp cross member 176, and the hinge end support tubes 178 from a generally rectangular shape. The remaining components of the loading ramp 164 are slidably attached to the two hinge end support tubes 178. In particular, the rectangular frame 166 slides into the two hinge end support tubes 178. Pins can be inserted through holes in the rectangular frame 166 and the two hinge end support tubes 178 to keep the rectangular frame 166 extended to a desired length. As shown in FIGS. 11A and 11B, the loading ramp 164 is preferably held in an upright position when vertical and lowered against the rear base end 118. In particular, the rectangular frame 166 is rotated upright and lowered against the rear base end legs 124. In this position the loading ramp 164 prevents all-terrain vehicles, lawnmowers, and other hauled items from falling off the rear of the vehicle. The loading ramp 164 can then be rotated to a downward position by pulling out one or more pins from holes penetrating through the rectangular frame 166 and the two hinge end support tubes 178, lifting the loading ramp 164 upward as noted by the arrow, rotating the loading ramp 164 downward, and reinserting one or more pins. The pins are preferably chained or otherwise tethered to the truck bed organizer 100. Additionally, each pin preferably has a wire clip that prevents the pin from unintentionally falling out.

If more than one loading ramp 164 is used, the loading ramps 164 are preferably positioned adjacent to one another such that the wheels of any vehicle 102, 104 may conveniently navigate up the loading ramps 164 and onto the deck 144. The loading ramp 164 is preferably comprised of a generally rectangular frame 166 and a plurality of loading ramp cross bars 168 spanning the generally rectangular frame 166. The loading ramp 164 is preferably substantially constructed of one inch by 0.083 inch wall square tubing with about three inch bend radii free of buckling. If one loading ramp 164 is used, it preferably measures about forty-six inches wide by about twenty-nine inches long. If two loading ramps 164 are used side-by-side, each preferably measures less than twenty-three inches wide. The loading ramp 164 preferably has openings between the loading ramp cross bars 168 such that dirt, mud, and water fall from the wheels of the vehicle 102, 104 being loaded such that the truck bed organizer 100 and the truck remain relatively clean. Also, the spacing of the loading ramp cross bars 168 can increase traction of the wheels of the vehicle 102, 104 and the loading ramp 164, thereby facilitating loading of the vehicle 102, 104. Additional parts or accessories may also be attached to the loading ramp 164, and the loading ramp may have alternate dimensions, materials, and shapes. For example, raised sides or guide rails can optionally be attached to the loading ramp 164 to prevent the vehicle 102, 104 from slipping off the sides of the loading ramp 164 while loading or unloading.

The base sides 116, rear base end 118, front cab base end 136, and base brace 138 of the truck bed organizer 100 are preferably substantially made of metal tubing, steel tubing, aluminum tubing, structural members having physical properties similar to metal tubing, or combinations thereof. Specifically, the following materials and dimensions are preferably used. The base sides 116, rear base end 118, front cab base end 136, and base brace 138 are made of 1.5 inch by 0.065 inch wall or 1.25 inch by 0.083 inch wall square powder coated steel tubing. The base side rods 106 are about seventy-two inches long, the base side legs 110 are about twenty inches long, the rear base end rod 120 is about forty-six inches long, the rear base end legs 124 are about twenty inches long, and the front cab base end rod 128 is about forty-six inches long. The base side rod ends 108, rear base end rod ends 122, and front cab base end rod ends 130 have about four inch bend radii free of buckling. Bolt holes about 0.3125 inch in diameter are suitably positioned along the truck bed organizer 100 for securely bolting the components of the truck bed organizer 100 together. Hex HD bolts, carriage bolts, and eye bolts may be used.

As shown in FIG. 12, the truck bed organizer 100 is preferably placed in the bed of a truck such that one can carry plywood, boards, a john-boat, bicycles, an all-terrain vehicle, or anything that is too wide to fit between the fenders of a pickup truck, or, that consumes the room needed for other equipment to fit in the truck bed or box, such as power tools, rakes, shovels, saw horses, fishing equipment, coolers, and such.

Although specific dimensions and materials are described herein, alternative but functionally similar dimensions and materials may be used. For example, some or all dimensions may be scaled up for using the truck bed organizer 100 in a large truck bed or scaled down for using the truck bed organizer 100 in a small truck bed. Alternative means of attachment may also be used for assembling the truck bed organizer 100, such as bolts, dowels, pins, clamps, fasteners, clips, joints, rivets, screws, glue, hooks, clasps, latches, nails, paste, adhesives, pegs, hinges, tapes, welds, and other securing means. Additionally, two or more elements described herein as separate components may in fact be manufactured as a single component.

The truck organizer of the present invention is described in these terms, these dimensions, and using these components for convenience purpose only. It would be readily apparent to one of ordinary skill in the art to manufacture and use a comparable truck organizer using different dimensions and/or comparable components.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A truck bed organizer, the truck bed having a floor, a driver side wall, a passenger side wall, and a cab wall, said organizer comprising:
    two base sides, wherein each said base side comprises a substantially straight elongated base side rod smoothly arcing at each of two base side rod ends into two base side legs, wherein said base side rods are substantially parallel, wherein said base side legs are substantially parallel, wherein said base side legs are substantially perpendicular to said base side rods, wherein each said base side leg ends in a base side foot, and wherein said base side feet lie substantially in a floor plane;
    a rear base end comprising a substantially straight elongated rear base end rod smoothly arcing at each of two rear base end rod ends into two rear base end legs, wherein said rear base end rod is substantially perpendicular to said base side rods, wherein said rear base end legs are substantially parallel, wherein said rear base end legs are substantially parallel to said base side legs, wherein said rear base end legs are substantially perpendicular to said rear base end rod, wherein each said rear base end leg is attached to one of said base side legs; wherein each said rear base end leg ends in a rear base end foot, and wherein said rear base end feet lie substantially in said floor plane; and
    a front cab base end comprising a substantially straight elongated front cab base end rod smoothly arcing at each of two front cab base end rod ends into two front cab base end legs, wherein said front cab base end rod is substantially perpendicular to said base side rods; wherein said front cab base end legs are substantially parallel, wherein said front cab base end legs are substantially parallel to said base side legs, wherein said front cab base end legs are substantially perpendicular to said front cab base end rod, wherein each said front cab base end leg is attached to one of said base side legs such that said two base sides, said rear base end, and said front cab base end form a substantially rectangular shape, wherein said front cab base end legs are longer than said rear base end legs, wherein each said front cab base end leg ends in a front cab base end foot, and wherein said front cab base end feet lie substantially in said floor plane.

2. The truck bed organizer of claim 1, further comprising:
    a base brace extending from about a midpoint of said rear base end rod to about a midpoint of said front cab base end rod.

3. The truck bed organizer of claim 1, further comprising:
    a means for securing a vehicle on said base sides.

4. The truck bed organizer of claim 3, wherein said means for securing a vehicle comprises:
    a deck rigidly attached to said organizer, wherein said deck is substantially flat, and wherein said deck extends from about said rear base end rod to about said front cab base end.

5. The truck bed organizer of claim 4, wherein said deck comprises a single plate spanning at least said base side rods.

6. The truck bed organizer of claim 4, wherein said deck is made of a material selected from the group consisting of: decking treated lumber, outdoor plywood, aluminum treadplate, steel treadplate, and expanded metal.

7. The truck bed organizer of claim 3, wherein said means for securing a vehicle comprises a bicycle holder assembly rigidly attached to said organizer.

8. The truck bed organizer of claim 7, wherein said bicycle holder assembly comprises:

a front support member spanning said base sides; and
a plurality of front wheel slots attached along said front support member.

9. The truck bed organizer of claim 8, wherein said bicycle holder assembly further comprises:
a rear support member spanning said base sides; and
a plurality of rear wheel chocks attached along said rear support member, wherein said rear wheel chocks are aligned with said front wheel slots.

10. The truck bed organizer of claim 9, wherein said bicycle holder assembly further comprises:
a plurality of front wheel chocks attached along said front support member, wherein said front wheel chocks alternate with said front wheel slots; and
a plurality of rear wheel slots attached along said rear support member, wherein said rear wheel slots are aligned with said front wheel chocks.

11. The truck bed organizer of claim 1, further comprising:
a first loading ramp attached to said rear base end.

12. The truck bed organizer of claim 11, wherein said first loading ramp is rotatably attached to said rear base end rod of said rear base end.

13. The truck bed organizer of claim 12, wherein said first loading ramp comprises:
a first loading ramp rectangular frame; and
a plurality of first loading ramp cross bars spanning said first loading ramp rectangular frame.

14. The truck bed organizer of claim 11, further comprising:
a second loading ramp attached to said rear base end adjacent to said first loading ramp.

15. The truck bed organizer of claim 1, wherein said base sides, said rear base end, said front cab base end, and said base brace are substantially made of a material selected from the group consisting of metal tubing, steel tubing, aluminum tubing, and combinations thereof.

16. A truck bed organizer, the truck bed having a floor, a driver side wall comprising a driver side wall upper rim and driver side wall wheel well cover, a passenger side wall comprising a passenger side wall upper rim and a passenger side wall wheel well cover, and a cab wall, the truck bed organizer comprising:
an elevated flat platform sized to fit a truck bed parallel to the floor above the driver side wall wheel well cover and the passenger side wall wheel well cover;
a means for positioning said elevated flat platform parallel to the floor above the driver side wall wheel well cover and the passenger side wall wheel well cover without diagonally bracing said elevated flat platform, wherein said means for positioning is adapted to be freestanding from the driver side wall and the passenger side wall; and
a substantially empty storage cavity between said elevated flat platform, the floor, the driver side wall wheel well cover, and the passenger side wall wheel well cover when the truck bed organizer is placed in the truck bed.

17. The truck bed organizer of claim 16, further comprising:
a means for loading a vehicle onto said elevated flat platform.

18. The truck bed organizer of claim 16, further comprising:
a means for securing a vehicle on said elevated flat platform.

19. A truck bed organizer suitable for organizing a truck bed, the truck bed having a floor, a driver side wall, a passenger side wall, and a cab wall, said organizer comprising:
a driver side wall base side adapted to fit in the truck bed substantially adjacent to the driver side wall;
a passenger side wall base side adapted to fit in the truck bed substantially adjacent to the passenger side wall;
a front cab base end adapted to fit in the truck bed substantially adjacent to the cab wall, wherein said front cab base end is rigidly attached to said driver side wall base side and said passenger side wall base side;
a rear base end adapted to fit in the truck bed, wherein said rear base end is rigidly attached to said driver side wall base side and said passenger side wall base side such that said driver side wall base side, said passenger side wall base side, said front cab base end, and said rear base end are substantially rectangularly configured;
an elevated flat platform rigidly attached to said driver side wall base side and said passenger side wall base side; and
a substantially empty storage cavity defined by said elevated flat platform, said driver side wall base side, and said passenger side wall base side, wherein said storage cavity is substantially obstructionless between said front cab base end and said rear base end, and wherein no diagonal cross-support members extend from said driver side wall base side, said passenger side wall base side, said front cab base end, or said rear base end toward said elevated platform.

20. The truck bed organizer of claim 19, further comprising:
a means for loading a vehicle onto said elevated flat platform.

* * * * *